United States Patent

[11] 3,567,927

| [72] | Inventor | Alfred E. Barrington<br>Lexington, Mass. |
|---|---|---|
| [21] | Appl. No. | 815,367 |
| [22] | Filed | Apr. 11, 1969 |
| [45] | Patented | Mar. 2, 1971 |
| [73] | Assignee | the United States of America as represented by the Administrator of the National Aeronautics and Space Administration |

[54] ION MICROPROBE MASS SPECTROMETER FOR ANALYZING FLUID MATERIALS
8 Claims, 2 Drawing Figs.

[52] U.S. Cl. ................................. 250/49.5, 250/41.9
[51] Int. Cl. ................................. H01j 37/00; G01n 23/00
[50] Field of Search ........................... 250/41.9 (ISE), 49.5 (2), 49.5 (8), 49.5 (9)

[56] References Cited
UNITED STATES PATENTS
| 2,826,701 | 3/1958 | Columbe | 250/49.5 |
| 2,976,413 | 3/1961 | Robinson | 250/49.5X |

OTHER REFERENCES
" Mass-spectrometric micro-surface analysis" by the Geophysics Corporation of America of Bedford, Massachusetts, Received March 25, 1963, 5 Pages. 250-49.5

*Primary Examiner*—William F. Lindquist
*Attorneys*—John R. Manning, Herbert E. Farmer and Garland T. Mc Coy ABSTRACT: An improved ion microprobe mass spectrometer type apparatus is provided that is suitable for analyzing trace amounts of a fluid. The present invention utilizes a target electrode for holding the sample, and a means for cooling the surfaces of the target to below a fixed temperature for a determined period of time. A stream of sample fluid is directed over the cooled surfaces of the target and is condensed thereon after which the target surface is sputtered by an incident, high intensity primary beam directed obliquely onto the surface thereof. Thereafter, means is provided for focusing the electrically charged ions of sample material that result in a secondary beam produced due to the bombardment of the sample layer. Additional means is provided to remove the prior material from the target surfaces after each analysis, so that the target surface is prepared for another sample layer.

The invention described herein was made by an employee of the United States Government and may be manufactured and used by or for the Government for governmental purposes without the payment of any royalties thereon or therefor.

PATENTED MAR 2 1971

3,567,927

ALFRED E. BARRINGTON
INVENTOR.

BY
John R. Manning
ATTORNEY

ION MICROPROBE MASS SPECTROMETER FOR ANALYZING FLUID MATERIALS

BACKGROUND OF THE INVENTION

This invention relates to ion probe mass spectrometers and more particularly to an improved, refrigerated target electrode in an ion probe mass spectrometer.

The development of the ion microprobe mass spectrometer constitutes a significant addition to the range of instrumentation for the analysis of solids. To a great extent, the acceptance of the instrument is due to its ability to perform nondestructive testing on thin films. Accordingly, such an instrument will find extensive use in such diverse fields as geology, metallurgy, semiconductor technology, surface chemistry, criminology and biology. Furthermore, the versatility and sensitivity limit thereof has presently only been approached due to the availability of only a meager number of standards for use therewith.

The prior art has found that the ion microprobe mass spectrometer is readily adapted to the analysis of impurity distribution in solid films having a thickness of less than about 100 microns, a detailed discussion and description of which is found in the publication entitled, "Progress in Nuclear energy," Series IX, Analytical Chemistry by A. E. Barrington, R. F. K. Herzog and W. P. Poschenrieder published 1966 by Pergamon Press. In general, the prior art apparatus has a primary source of noble gas ions integral with a target chamber, a mass analyzer and an ion detector. A well-trapped, mercury diffusion pump is provided to pump down the target chamber, while the primary ion source is evacuated by means of another mercury diffusion pump. The analyzer section is then evacuated by a combination zeolite sorption trap/titanium sputter-ion pump, mounted for continuous operation, if desired.

The instrument is operated in the test mode by introducing a sample, mounted on a target electrode in the target chamber, and reducing the target chamber pressure to less than about $10^{-6}$ Torr. A low voltage arc is then struck in the duoplasmatron ion source which is maintained at a pressure of about 0.02 Torr of a noble gas such as Argon, Xenon or the like. The resulting arc is then focused and severely constricted by an axially disposed magnetic field to create a very dense plasma. Next, the intensified beam is passed through a pinhole in the anode and accelerated by a conically shaped electrode. The beam is then electrostatically deflected so as to bombard the target at an oblique angle of incidence. This then causes a higher rate of sputtering than normal impact. No chemical reaction occurs and the target electrode remains uncontaminated due to the noble gas ions.

The secondary ions of surface material resulting from the sputtering of the sample layer, are next focused electrostatically into a mass spectrometer, where the ionized material is separated in a magnetic sector according to their respective mass-to-charge ratios. The sorted ions are then sorted again according to their energy, by means of an electrostatic analyzer. The intensity of the ion current corresponding to a given mass peak is then measured with an electron multiplier and a vibrating reed electrometer. A spectrum is obtained, either when the potential through which the surface ions are accelerated is changed, together with the potential of the electrostatic analyzer, or when the magnitude of the magnetic field is changed at constant ion accelerating potential. A permanent record of the spectrum is obtained by synchronizing the horizontal sweep of an X—Y recorder with the parameter varied and making the vertical deflection proportional to the ion current.

In order to determine the chemical composition of the wide variety of materials encountered in present-day technology and to detect trace-contaminants in the parts-per-million range, it has been proposed that modern analytical techniques should satisfy the following requirements:

1. The sensitivity limit should exceed one part per million,
2. it should work equally well for materials which may be conductors, semiconductors and insulators,
3. it should be nondestructive,
4. it should be capable of detecting all chemical impurity elements regardless of the major components of the matrix, and
5. it should be capable of differentiating between surface impurities and bulk impurities.

Relative to the analysis of bulk solids and thin films, the above-mentioned requirements are satisfied by techniques employing the ion microprobe mass spectrometer. However, there still exists in the art a need to satisfy the above-mentioned requirements relative to techniques for the analysis of fluids.

SUMMARY OF THE INVENTION

As will be hereinafter used, the term "fluid" is intended to include vapors, gases, and mixtures and solutions thereof.

In the improved ion microprobe mass spectrometer type apparatus herein presented, a target electrode for holding the sample is cooled below a fixed temperature and maintained at the lowered temperature for a predetermined period of time. A stream of fluid is directed over the cooled surfaces of the target and deposited thereon. Means is provided for producing an intense beam of ions of a chemically inert gas and for focusing and accelerating the beam. The deposited target is then obliquely bombarded by the beam to sputter or ionize the atoms of the sample. These sputtered ions have a relatively low velocity and are selectively focused into an analyzer. If desired, heating means may be employed to clean the target surfaces after an analysis. The target electrode may be of any conventional design and fabrication.

In one embodiment, the cooling means is integral with the target electrode and consists of a structure having a channel formed therein for the flow of refrigerant therethrough. In another embodiment, both the cooling means and the heating means are an integral part of the electrode and are sandwiched between the sample holding surfaces. The heater device may be of conventional electrical design and fabrication, connected to a source of power by means of conventional circuitry.

Thus, one is able to provide an improved method for analyzing trace amounts of fluid by directing a stream of fluid sample over the surfaces of a target electrode which has been cooled below a fixed temperature. After the analysis the target surfaces are cleansed of the remaining sample layer and thus are prepared for the next analysis.

All or just a portion of the fluid may be collected for analysis, if desired. If the sample fluid is a gas mixture, depending on the temperature of the target surfaces, all the fluid may be condensed or the fluid may be fractionally condensed, thereby providing the practitioner of the invention the advantage of a selective system for the analysis of unknowns.

The selection of the refrigerant used is determined chiefly by the selected operational temperature of the target electrode. Conventional refrigerants may be employed, provided they are compatible for use with the apparatus, such as compressed gases or cryogenic fluids, for example. Thus, for the study of atmospheric gases, it may be desirable to eliminate the known major fraction of the atmosphere which would tend to mask the presence of the trace contaminants that are deposited on the target. Accordingly, an operational temperature is selected such that the known major components of the atmospheric gas stream will not be condensed and solidified on the target surfaces, yet allowing the lesser components to be deposited. Hence, the operational temperature of the target surfaces will be at, or below, about cryogenic fluid temperatures which may be employed to provide the desirable operational temperature for the analysis of atmospheric gases such as liquid nitrogen, liquid oxygen, liquid helium. Liquid nitrogen is preferred as a refrigerant because it is inert, is commercially available and is safer to use. When cryogenic fluids are employed as refrigerants, the use of special handling equipment is obviated.

The apparatus may also be employed for analysis in a normally combustible or explosive atmosphere, such as the oxygen rich atmosphere of a manned space craft, where the use of conventional spark discharge type analyzers would be precluded. Furthermore, those possessed of an ion microprobe mass spectrometer would be encouraged to modify the apparatus according to the teachings of the present disclosure to obtain the advantages offered for the study and analysis of fluids presently unobtainable from the apparatus of the prior art.

Accordingly, it is an object of the present invention to provide an improved method and apparatus for the analysis of fluids.

Still another object of the present invention is to provide a method and apparatus for the analysis of trace amounts of a gas.

The features of my invention which are believed to be novel are set forth with particularity in the appended claims. The invention itself, however, both as to its organization and method of operation, together with further objects and advantages thereof may best be understood by reference to the following description taken in conjunction with the following drawings.

DETAILED DESCRIPTION OF THE PREFERRED EMBODIMENTS

Figure 1:
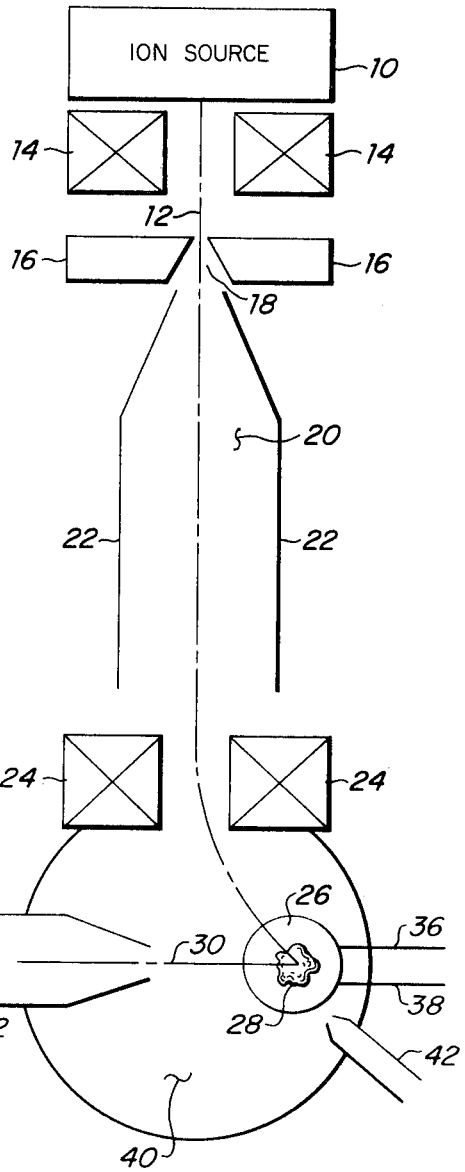
FIG. 1 is a schematic representation of an improved ion probe mass spectrometer apparatus.

Referring now to FIG. 1, there is shown a duoplasmatron ion source 10 of electrically charged bodies which produces a primary beam 12 which is axially disposed, with respect to a focusing magnet 14 and perpendicular to an aperture 18 formed in an anode 16. The beam 12 is focused by the magnet 14 and passes through aperture 16 into a chamber 20 where it is formed and shaped by an electrostatic lens 22. A deflection means 24 directs the beam 12 obliquely onto the surface of a target electrode 26 which has been previously coated with a layer of a solidified sample fluid 28. The impingement of the beam 12 onto the sample layer 28 causes a portion of the layer 28 to be sputtered producing a secondary beam 30 which contains ionized sample material from the sample layer 28. A selective focusing means 32 directs the relatively low charged ions of the beam 30 into a mass analyzer 34 for analysis.

According to the method of the present invention, trace amounts of a fluid, such as a gas, may be analyzed by first cooling the surfaces of the target electrode 26. The electrode 26 is refrigerated by introducing a suitable refrigerant from a source (not shown) into an input refrigeration line 36. From a line 36 it flows into a channel in the target electrode 26. Thereafter the refrigerant is allowed to exit through a line 38. Next a fluid sample stream is introduced into a target chamber 40 from a sample source (not shown) by means of a fluid line 42 and directed over the previously cooled surfaces of the target electrode 26. A portion of the fluid stream is condensed onto the surface of the target electrode 26, which solidifies and forms the sample layer 28.

Figure 2:
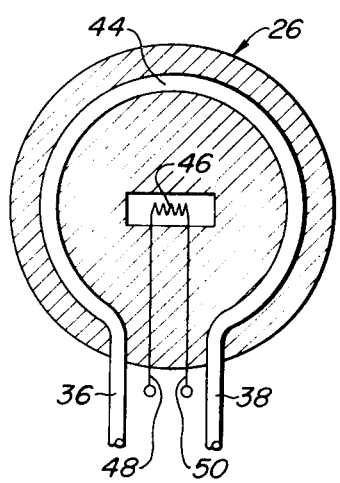
FIG. 2 is a transverse, sectional view of the structure of the target electrode of FIG. 1.

Referring now to FIG. 2, there is shown a sectional view of the target electrode 26 of FIG. 1 that is provided with an input refrigeration line 36, the exit line 38 and a communicating portion 44 which allows the refrigerant to circulate and cool the electrode 26. Additionally, to cleanse the target after an analysis, there is shown a heating element 46 and a pair of leads 48,50 for providing suitable power to operate the element 46.

While there has been described what is presently considered the preferred embodiment of the invention it will be obvious to those skilled in the art, that various changes and modifications may be made therein without departing from the inventive concept contained therein and it is, therefore, aimed to cover all such changes and modifications as fall within the true spirit and scope of the invention.

I claim:

1. Apparatus for the analysis of trace amounts of materials having a source of primary ions, a target electrode for retaining a layer of sample for testing, means for directing an intensified primary ion beam obliquely onto the surface of said target to sputter a portion of the sample layer, a mass analyzer, and means for directing the secondary ions of the sputtered material to said analyzer for analysis, the improvement for the analysis of fluid materials which comprises:
   a. means for cryogenically cooling the surface of said target electrode to below a fixed temperature; and
   b. means for directing a stream of fluid to be analyzed over the cooled surface of the electrode to condense and solidify a layer of the stream thereon.

2. The apparatus of claim 1 further comprising:
   heater means for cleaning the target electrode by heating the surface thereof to volatilize the tested sample layer.

3. The apparatus of claim 2 wherein the heater means is integral with the target electrode.

4. The apparatus of claim 1 wherein the cooling means is an integral element of said target electrode.

5. The apparatus of claim 1 wherein the primary beam consists of noble gas ions.

6. A method of analyzing trace amounts of fluid materials comprising the steps of:
   cryogenically cooling the surface of a target electrode to below a fixed temperature;
   directing a stream of fluid to be analyzed over the cooled surface of the electrode to condense and solidify a layer of the stream thereon;
   directing an intensified primary ion beam obliquely onto the surface of said target to sputter a portion of the layer; and
   mass analyzing the resultant secondary ions of the sputtered layer.

7. The method of claim 6 comprising the further step of heating the surface of the target electrode to volatilize the analyzed layer.

8. The method of claim 6 wherein the primary beam consists of noble gas ions.